April 11, 1950  G. COLEMAN  2,504,000
HOBBYHORSE
Filed Dec. 4, 1947  3 Sheets-Sheet 1
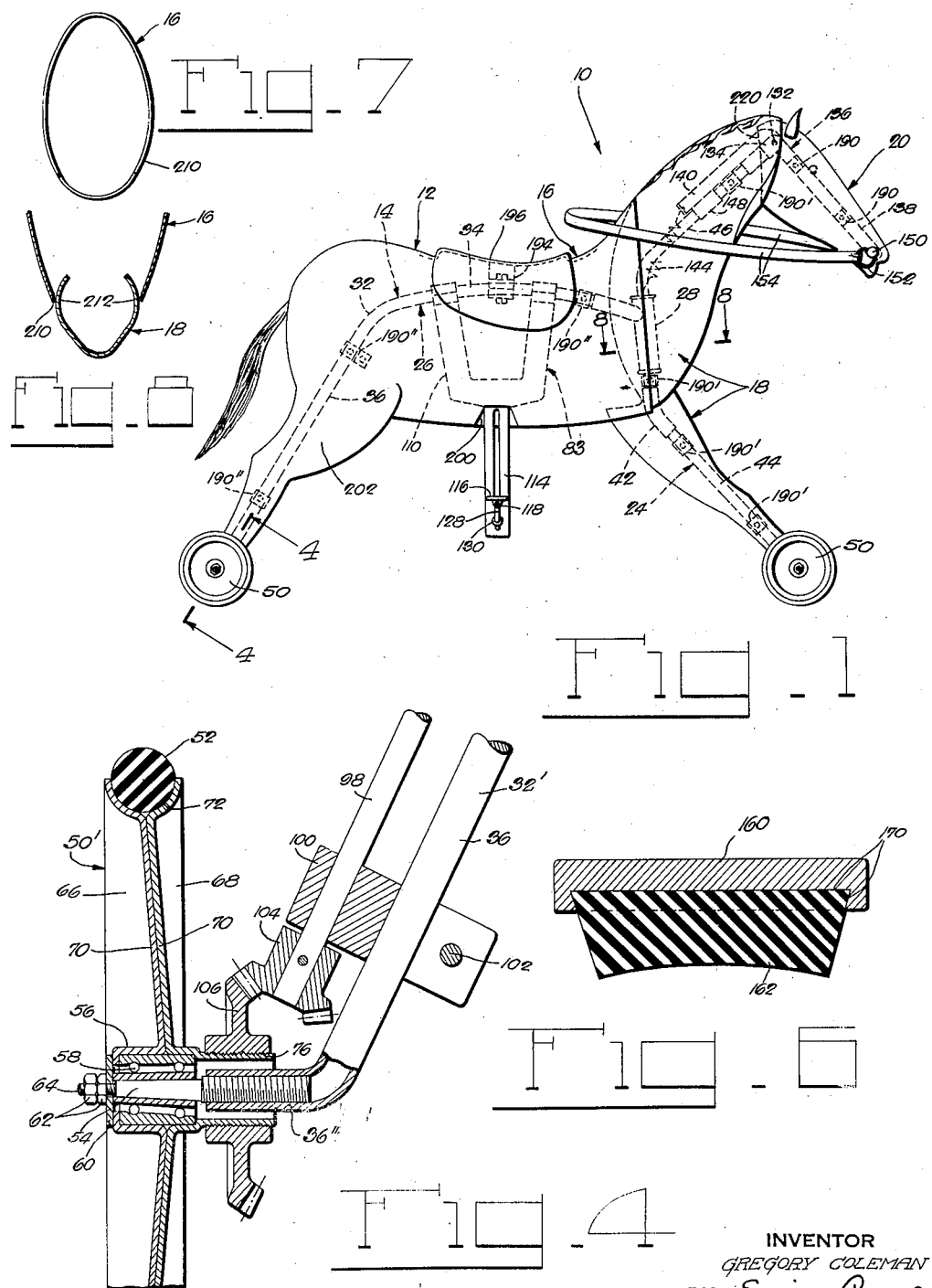

April 11, 1950 G. COLEMAN 2,504,000
HOBBYHORSE
Filed Dec. 4, 1947 3 Sheets-Sheet 2
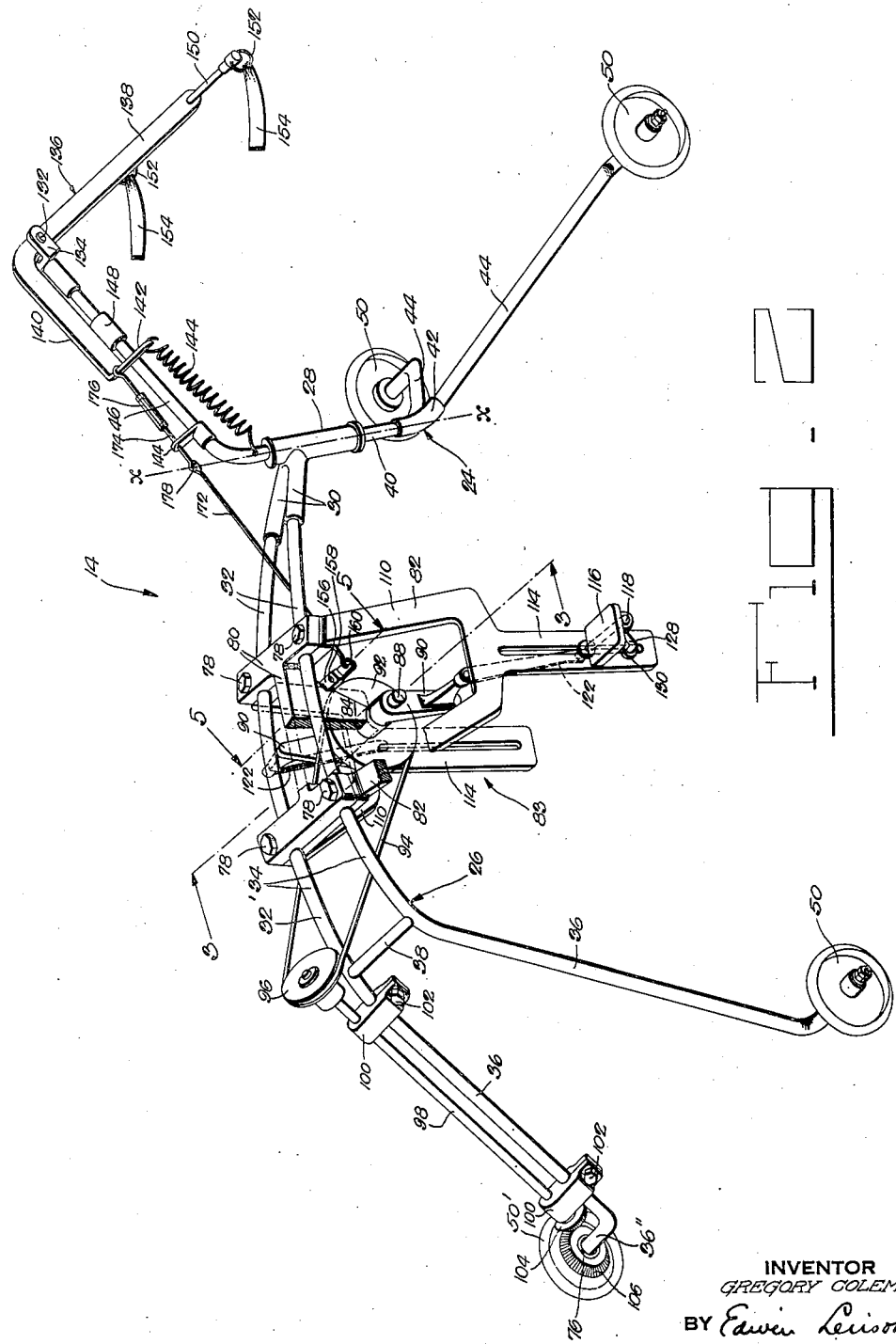
INVENTOR
GREGORY COLEMAN
BY Edwin Levisohn
ATTORNEY April 11, 1950  G. COLEMAN  2,504,000
HOBBYHORSE
Filed Dec. 4, 1947  3 Sheets-Sheet 3
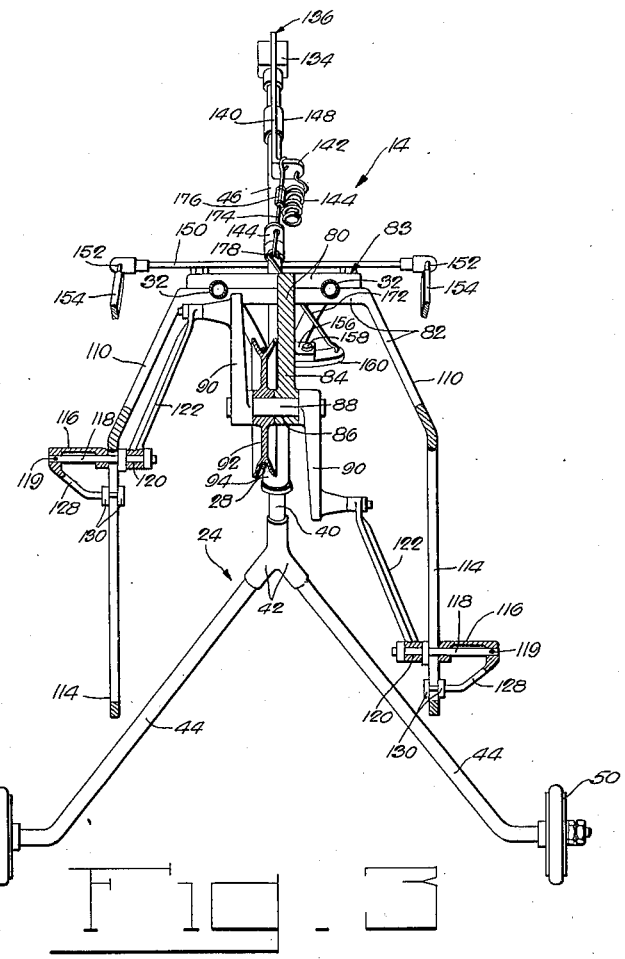
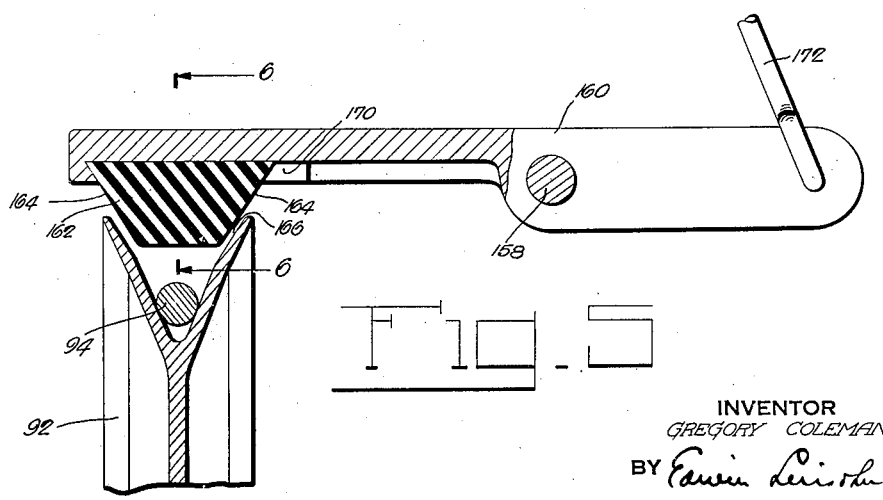
INVENTOR
GREGORY COLEMAN
BY
ATTORNEY Patented Apr. 11, 1950

2,504,000

UNITED STATES PATENT OFFICE 2,504,000

HOBBYHORSE

Gregory Coleman, New York, N. Y.

Application December 4, 1947, Serial No. 789,724

9 Claims. (Cl. 280—1.189)

This invention relates to toy horses for youngsters, and more especially to hobby horses of the propelled type.

It is the primary object of the present invention to provide a hobby horse the riding of which not only compels a youngster to imitate to a large extent the manipulations of a real horseback rider, but also imparts to the youngster many of the thrills of an actual horseback ride without involving any of the dangers thereof.

Accordingly, it is a more specific object of the present invention to provide a wheeled hobby horse which is propelled by stirrup action, steered by a left or right pull on the reins, and braked or stopped by a backward pull on the reins.

It is another specific object of the present invention to construct a hobby horse so that its imitation head will swing to either side to which the horse is steered, and will nod when the brake is applied.

It is another important object of the present invention to provide for the hobby horse a carriage which is of simple and durable construction, and lends itself to efficient and inexpensive mass production.

The above and other objects, features and advantages of the invention will be more fully understood from the following description, reference being had to the accompanying illustrative drawings.

In the drawings:

Fig. 1 is a side elevation of a hobby horse embodying the present invention;

Fig. 2 is a perspective view of the carriage of the instant hobby horse;

Fig. 3 is a cross section through the carriage, taken substantially on the line 3—3 of Fig. 2;

Fig. 4 is an enlarged, fragmentary section through the driving wheel on one of the rear legs of the carriage, substantially as taken on the line 4—4 of Fig. 1;

Fig. 5 is an enlarged fragmentary section taken on the line 5—5 of Fig. 2;

Fig. 6 is a section taken on the line 6—6 of Fig. 5;

Fig. 7 is an end view of one of the sections of which the imitation body of the hobby horse is made; and Fig. 8 is a section taken on the line 8—8 of Fig. 1.

Referring to the drawings, and more particularly to Fig. 1 thereof, the reference numeral 10 designates a hobby horse of which the imitation body 12 of a horse is mounted on a wheeled carriage 14. The imitation body 12 consists, in the present instance, of three separate sections 16, 18 and 20. Thus, the body section 16 may simulate the back and hind legs of a horse, the body section 18 may simulate the chest, neck and fore legs of a horse, and the body section 20 may simulate the head of a horse.

Referring now more particularly to Fig. 2, there is shown the wheeled carriage 14 on which the described imitation body 12 of a horse is mounted in a manner hereinafter referred to. The carriage 14 comprises a frame consisting of complementary frame units 24 and 26. The frame unit 26 comprises a steering post 28 of the type commonly used in bicycles, and has an integral laterally extending mounting fork 30 of tubular legs in which the leading ends of two frame bars 32 are received and suitably secured as by brazing, for instance. The frame bars 32 extend rearwardly as at 34, similarly as a horse's back, and continue downwardly and preferably outwardly as at 36, similarly as a horse's hind legs. The frame bars 32 are preferably reinforced by one or more cross ties 38 which are suitably secured to the former, as by welding, for instance.

The frame unit 24, hereafter referred to as the "steering" unit, comprises a shank 40, having a fork 42 of tubular legs wherein are suitably mounted, as by brazing, frame bars 44 that diverge downwardly similarly as a horse's fore legs. The steering unit 24 further comprises a frame bar 46 which extends similarly as a horse's neck. The shank 40 of the steering unit 24 is suitably journaled in the steering post 28 of the other unit 26 and therein suitably coupled with the frame bar 46 for joint rotation. The frame bars 32, 44 and 46 are preferably made of tubing of relatively light, yet strong metal, such as steel or aluminum, for instance.

The frame bars 32 and 44 carry at their lower ends rotary wheels 50, respectively. The mountings of the wheels 50 are preferably identical, and may be as shown in Fig. 4 for the sole driving wheel 50' of the carriage. Thus, wheel 50' is mounted on the laterally bent end 36" of the downwardly extending portion 36 of the frame bar 32' through intermediation of an axle 54 which may threadedly be received in the laterally bent bar end 36". Interposed between the axle 54 and the hub 56 of the wheel 50' is an antifriction bearing 58, and wheel 50' and bearing 58 are retained on the axle 54 by a washer 60 which is held in place by nuts 62 on the threaded shank 64 of the axle. The driving wheel 50' may, like the remaining wheels 50, be of any conventional toy-wheel construction. In the present instance, each wheel 50 may be made of two complementary sheet metal disks 66 and 68 which are suitably joined at their abutting webs 70, as by spot welding, for instance, and form at their outer periphery a well 72 in which a solid rubber tire 52 may be mounted. While the driving wheel 50' is, for a purpose hereinafter described, provided with an axial hub extension 76 (Fig. 4), the remaining wheels 50 need not have such a hub extension, but may otherwise be identical with, and mounted like, the driving wheel 50'.

Suitably mounted on the bars 32 of the frame unit 26 are complementary sections 80 and 82 of a saddle-like bracket 83 (Figs. 2 and 3), which carries certain parts of the propelling means to be described for the driving wheel 50'. More particularly, the bracket sections 80 and 82 are conveniently clamped to the frame bars 32, and simultaneously secured to each other, by bolts 78. The mounted bracket 83 thus also effectively reinforces the frame bars 32 against collapse under load. Bracket section 80 is provided with a depending web 84 in which is suitably journaled at 86 a stub shaft 88 (see also Fig. 3) on the ends of which are mounted opposed crank arms 90, respectively. Also mounted on the stub shaft 88 and interposed between the web 84 and one of the crank arms 90 is a pulley 92, which is drivingly connected by a belt 94 with another pulley 96, mounted on the upper end of a shaft 98 which is journaled in suitable bearing brackets 100 that may conveniently be clamped at 102 to the adjacent frame bar 32'. Mounted on the lower end of the shaft 98 is a bevel gear 104 which is in permanent mesh with a companion gear 106 on the hub extension 76 of the driving wheel 50'. Gear 106 may conveniently be threaded over the hub extension 76 (Fig. 4). The end of the hub extension 76 is preferably stemmed against the hub of the gear 106 thereon so as to prevent the latter from working loose on the hub extension 76 under all circumstances. As shown in Figs. 2 and 4, the shaft 98 extends, in the present instance, substantially parallel to the adjacent portion of the frame bar 32', and the rotary axes of the pulleys 92 and 96 intersect each other, wherefore the belt 94 is necessarily twisted.

The bracket section 82 has opposite, downwardly slanting integral portions 110 which terminate in substantially parallel, slotted guides 114, respectively, in which stirrups 116 are reciprocable (Figs. 2 and 3). More particularly, each stirrup 116 may be pinned at 119 on a rod 118 which extends through the adjacent guide 114 and receives at 120 a connecting rod 122 which is also received by the adjacent crank arm 90. Depending from each stirrup 116 is a finger 128 which extends through the adjacent guide 114 and carries spaced collars 130 which straddle the guide 114 and serve to hold the stirrup for free and unimpeded reciprocatory motion in its guide 114.

Pivotally mounted at 132 in a forked forward end 134 of the frame bar 46 is a bell crank lever 136, the arm 138 of which extends longitudinally in the head section 20 of the imitation body 12, and the other arm 140 may have a laterally bent end 142. A tension spring 144 normally rocks lever 136 into the position shown in Figs. 1 and 2 in which the arm 140 thereof bears against a collar 148 on the frame bar 46 and the horse's head extends forwardly as in normal running. The collar 148 is preferably made of rubber or the like, so as to be substantially noiseless when the arm 140 strikes thereagainst. Carried by the free end of the arm 138 of the bell crank lever 136 is a transverse rod 150, to the opposite ends of which are attached at 152 reins 154 of any suitable flexible material, such as leather.

The depending web 84 of the bracket section 80 is provided with a laterally extending lug 156 (Figs. 2 and 3) on which is pivotally mounted at 158 a lever 160, carrying a pad 162 of any suitable brake material, such as hard rubber, for instance, which has tapered sides 164 (Fig. 5) that are adapted to engage the opposite walls of the V-shaped peripheral groove 166 of the pulley 92 above the belt 94 therein. The brake pad 162 may conveniently be received in a dove-tail groove 170 in the lever 160 (Fig. 6). Lever 160 is connected by links 172 and 174 with the laterally bent end 142 of the arm 140 of lever 136. More particularly, link 174 is preferably lengthwise adjustable through the interposition of a turnbuckle 176, and the links 172 and 174 are connected at 178 by being interlooped in the conventional fashion shown in Fig. 2, their interlooped connection acting as a universal joint. Suitably mounted on the frame bar 46 is a bracket 144 having a hole through which passes the link 174 and which acts as a fulcrum for the latter. Link 174 is so adjusted as to its length, and the bracket 144 is so positioned on the frame bar 46, that the looped connection 178 between the links 172 and 174 lies substantially on the turning axis $x$—$x$ of the steering frame 24 when the bell crank lever 136 assumes the normal position shown in Fig. 2. In thus positioning the universal connection 178 between the links 172 and 174, link 172 will not, or will only imperceptibly, move lengthwise when the hobby horse is steered in any direction, thus leaving the brake lever 160 in non-braking position at all times, except when the bell crank lever 136 is rocked clockwise as viewed in Fig. 2 from the position there shown.

While any desired form of an imitation body of a horse may be mounted in any suitable manner on the carriage 14, with a view to conceal the parts of the latter to a maximum extent and to lend to the toy carriage the more or less realistic appearance of a horse, it is preferred that the hereinbefore-mentioned body sections 16, 18 and 20 be separate parts and mounted separately on the frame units 26, 24 and lever 136, respectively. Thus, any suitably fabricated hollow body section 20, which resembles the head of a horse, may be mounted in any suitable manner, as by steel bands 190 (Fig. 1), on the bell crank lever 136 so as to be rockable with the same on the steering unit 24 and lend to the toy carriage the realistic appearance of a nodding horse's head, when the reins 154 are pulled backward for braking or stopping the carriage. Likewise, the hollow body section 18, which may also be fabricated in any suitable manner and more or less realistically resemble the chest, neck and fore legs of a horse, may be mounted in any suitable manner on the steering unit 24, as by similar steel bands 190'. The fore legs 192 of the body section 18 preferably surround the frame bars 44 of the steering unit 24 at least down to the point where they are bent outwardly for the mounting thereon of the front wheels 50. Finally, the body section 16, which like the body sections 18 and 20, may be fabricated in any suitable manner and more or less realistically resemble the back and hind legs of a horse, may be mounted in any suitable manner on the frame unit 14 by similar straps 190'' and any suitable bracket 194. Body section 16 is preferably provided with an imitation saddle 196 for a rider, and may be open at the bottom, at least in part as at 200, for the outward extension of the stirrup guides 114 (Fig. 1). The hind leg portions 202 of the body section 16 preferably embrace the downwardly extending portions of the frame bars 32 so as to hide them, as well as the shaft 98 and parts carried thereby, as far as is practical. In order that the body section 18 may turn with the steering unit 24 without interference from the body section 16 on the other frame unit 26, body section 18 may be formed adjacent the oval front opening 210 of body section 16 (Figs. 1, 7 and 8) in the circular fashion indicated at 212 in Fig. 8, so as to turn in the opening 210 in much the same manner in which a ball turns in a socket provided therefor. Furthermore, the head section 20 has a portion 220 (Fig. 1) which normally projects into the adjacent body section 18 so that the horse's head is always continuous with its neck even when the head is nodded.

It will thus be seen that the instant hobby horse is so constructed that riding the same requires to a large extent the same activities as are required by an actual horseback rider. Thus, the instant horse is propelled by reciprocatory stirrup action, rather than by initial crank action as heretofore. Furthermore, the hobby horse is steered either to the left or right by a corresponding pull on the reins 154. Moreover, braking and stopping of the horse's motion is accomplished in much the same way as an actual riding horse is slowed down or stopped, namely by pulling the reins 154 backward. By compelling the rider of the instant hobby horse to undertake these activities in riding and handling the same, the rider experiences also many of the thrills of actual horseback-riding without, however, becoming exposed to the well-known dangers thereof. Thus, the neck and head of the hobby horse will turn to either side to which the latter is steered, much in the same way in which a horse reacts to being steered to either left or right. Also, a backward pull on the reins for the purpose of braking or stopping the horse, is accompanied by a nodding of the horse's head in much the same way in which a riding horse reacts to a backward pull on the reins.

Having thus described my invention, what I claim and desire to secure by Letters Patent, is:

1. A hobby horse, comprising a wheeled skeleton frame consisting of two hingedly connected complementary frame units so that said frame is steerable in any direction, an imitation body including the head of a horse substantially covering said frame and comprising separate sections mounted on said units, respectively, and relatively turnable with the latter on steering said frame, the leading frame unit including a pivoted support member extending into said head, one of said sections resembling a distinct forepart of a horse and the other section having a rider's seat, said first section comprising two separate parts of which one is the horse's head and is mounted on said member, the latter being spring-urged into a certain position in which said head part is held relatively high, and is rockable from said certain position to simulate nodding of said head part, and reins on said head part for nodding the latter and for steering said frame, a brake mechanism for said wheeled frame, and an operating connection between said mechanism and head part for actuating the former on nodding the latter.

2. A propelled carriage for a hobby horse, comprising a skeleton frame consisting of two complementary frame units of which one unit comprises a steering post, two bars of which first lengths diverge from said post and extend similarly as a horse's back and continuing lengths thereof extend downwardly similarly as a horse's hind legs, respectively, and the other unit is journalled in said post and has a bar support downwardly extending from said post similarly as a horse's fore legs, wheels rotatably mounted on the free ends of said bars and bar support, respectively, so that said frame may be wheeled, a bracket spanning and mounted on said first lengths of said bars for reenforcing the same, and driving means for one of said wheels, said bracket having opposite and downwardly extending guides, and said driving means comprises a shaft rotatably carried by, and extending along, one of said continuing bar lengths on which said one wheel is mounted, meshing bevel gears carried by said one wheel and the lower end of said shaft, respectively, a first pulley mounted on the upper end of said shaft, another pulley mounted on said bracket for rotation about a substantially horizontal axis, a belt drivingly connecting said pulleys, opposed crank arms on opposite sides of and turnable with said other pulley, stirrups reciprocable in said guides, respectively, and rods drivingly connecting said stirrups and crank arms, respectively.

3. A propelled carriage for a hobby horse, comprising a skeleton frame consisting of two complementary frame units of which one unit comprises a steering post, two bars of which first lengths diverge from said post and extend similarly as a horse's back and continuing lengths thereof extend downwardly similarly as a horse's hind legs, respectively, and the other unit is journalled in said post and includes a pivoted member normally spring-urged into a certain angular position similar to that of, and being noddable like, a horse's head and a bar support downwardly extending from said post similarly as a horse's fore legs, wheels rotatably mounted on the free ends of said bars and bar support, respectively, so that said frame may be wheeled, driving means for one of the wheels on said one unit comprising a grooved pulley rotatably mounted on said one unit, a belt driven by said pulley, a driving connection between said belt and said one wheel, and manually operable means for driving said pulley, a pivoted brake element on said one unit, and an operating connection between said member and brake element so that the latter is rocked into braking engagement with said pulley when said member is nodded.

4. A propelled carriage for a hobby horse as set forth in claim 3, in which said operating connection comprises two links connected with said member and brake element, respectively, and a universal joint connecting said links and being located on the journal axis of said other unit when said member is not nodded.

5. A propelled carriage for a hobby horse as set forth in claim 3, in which said operating connection comprises two links connected with said member and brake element, respectively, and a universal joint connecting said links and being located on the journal axis of said other unit when said member is not nodded, at least one of said links being lengthwise adjustable.

6. A carriage for a hobby horse, comprising a skeleton frame consisting of two complementary frame units hingedly connected with each other so that said frame is steerable with one of said units having a bar support downwardly projecting from the hinge connection between said units similarly as a horse's fore legs, the other unit having depending metal tubes extending similarly as a horse's hind legs, respectively, and having their lower ends bent outwardly co-axially of each other, axles threadedly mounted in said bent tube ends, respectively, and wheels rotatably mounted on said axles and lower end of said bar support, respectively.

7. A carriage for a hobby horse, comprising a skeleton frame consisting of two complementary frame units of which one unit comprises a steering post, two metal tubes of which first lengths diverge from said post and extend similarly as a horse's back and continuing lengths thereof extend downwardly similarly as a horse's hind legs, respectively, and have their lower ends bent outwardly co-axially of each other, and the other unit comprises a shank journalled in said post, and two metal tubes diverging from said shank and extending downwardly similarly as a horse's fore legs, respectively, and having their lower ends bent outwardly co-axially of each other, axles threadedly mounted in said bent tube ends, respectively, and wheels rotatably mounted on said axles, respectively.

8. A carriage for a hobby horse, comprising a skeleton frame consisting of two complementary frame units of which one unit comprises a steering post, two mutually reenforced bars extending from said post similarly as a horse's back and therebeyond continuing downwardly similarly as a horse's hind legs, respectively, and the other unit comprising a shank journaled in said steering post and two bars diverging from said shank and extending downwardly similarly as a horse's fore legs, respectively, wheels rotatably mounted on the free ends of said bars, respectively, so that said frame may be wheeled, another bar journaled with one end in said steering post and coupled to said shank and extending from said post similarly as a horse's neck, and a bar pivoted to the free end of said other bar and normally spring-urged into an angular position similar to that of a horse's head.

9. A propelled carriage for a hobby horse, comprising a skeleton frame consisting of two complementary frame units of which one unit comprises a steering post, two bars of which first lengths diverge from said post and extend similarly as a horse's back and continuing lengths thereof extend downwardly similarly as a horse's hind legs, respectively, and the other unit is journaled in said post and has a bar support downwardly extending from said post, wheels rotatably mounted on the lower ends of said bars and bar support, respectively, so that said frame may be wheeled, a bracket spanning and mounted on said first bar lengths for reenforcing the same, and driving means for one of said wheels comprising a shaft rotatably carried by, and extending along, that continuing bar length on which said one wheel is mounted, meshing bevel gears carried by said one wheel and the lower end of said shaft, respectively, a first pulley mounted on the upper end of said shaft, another pulley mounted on said bracket for rotation about an axis transverse to said shaft, a belt drivingly connected to said pulleys, and manually operable means for driving said other pulley.

GREGORY COLEMAN.

REFERENCES CITED

The following references are of record in the file of this patent:

UNITED STATES PATENTS

| Number | Name | Date |
|---|---|---|
| 229,655 | Albrecht | July 6, 1880 |
| 763,190 | Madonna | June 21, 1904 |
| 768,760 | La Londe | Aug. 30, 1904 |
| 694,131 | Frederick | July 21, 1908 |
| 1,396,475 | Tracey | Nov. 8, 1921 |
| 1,585,197 | Marcoux | May 18, 1926 |
| 2,120,102 | Kurelic | June 7, 1938 |
| 2,195,824 | Ochoa | Apr. 2, 1940 |
| 2,259,987 | Bailie | Oct. 21, 1941 |